Nov. 3, 1925.
L. DRESCHLER
1,560,417
MEASURING DEVICE FOR CUFFS OF TROUSERS
Filed Sept. 10, 1923   2 Sheets-Sheet 1
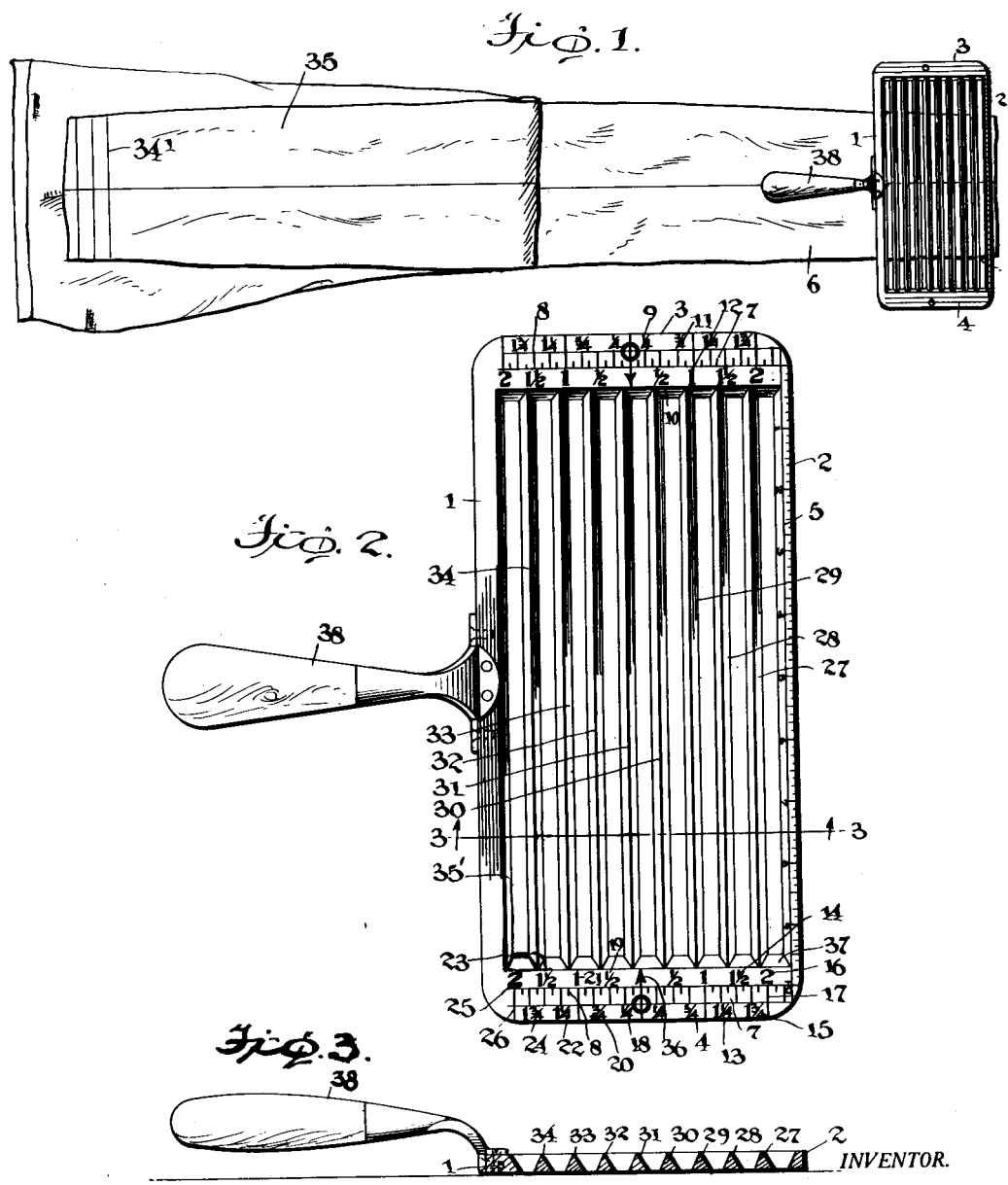
INVENTOR.
Louis Dreschler;
BY
Geo. P. Kimmel ATTORNEY.

Nov. 3, 1925.  1,560,417
L. DRESCHLER
MEASURING DEVICE FOR CUFFS OF TROUSERS
Filed Sept. 10, 1923   2 Sheets-Sheet 2
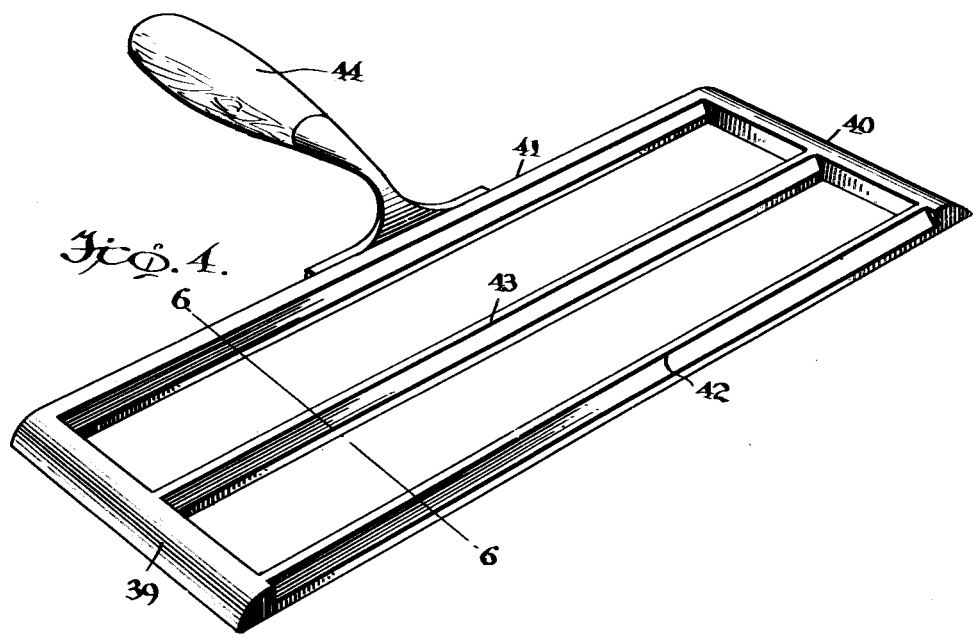
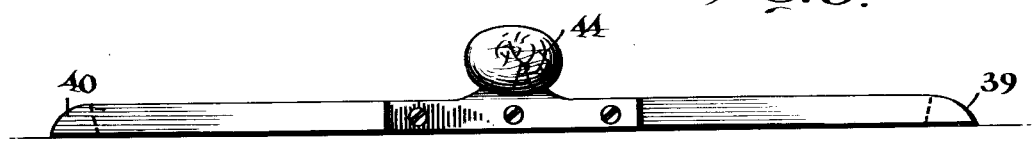
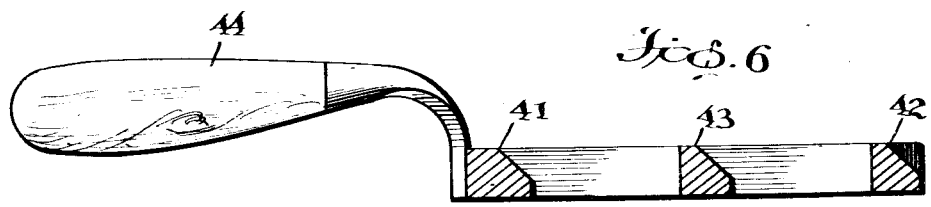
INVENTOR.
Louis Dreschler,
BY
Geo. P. Kimmel ATTORNEY.

Patented Nov. 3, 1925.

1,560,417

UNITED STATES PATENT OFFICE.

LOUIS DRESCHLER, OF ST. LOUIS, MISSOURI.

MEASURING DEVICE FOR CUFFS OF TROUSERS.

Application filed September 10, 1923. Serial No. 661,983.

*To all whom it may concern:*

Be it known that I, LOUIS DRESCHLER, a citizen of Austria, residing at St. Louis city, in the State of Missouri, have invented certain new and useful Improvements in Measuring Devices for Cuffs of Trousers, of which the following is a specification.

This invention relates to a measuring device for the cuffs of trousers, designed primarily for tailoring use, but it is to be understood that a measuring device, in accordance with this invention can be employed for any purposes wherein it is found applicable, and the invention has for its object to provide, in a manner as hereinafter set forth, a measuring device having means to provide for the accurate marking upon a trousers leg the size of cuff desired.

A further object of the invention is to provide, in a manner as hereinafter set forth, a trousers cuff measuring device having means to enable the accurate marking on trousers legs for varying sizes of cuffs.

Further objects of the invention are to provide, in a manner as hereinafter set forth, a trousers cuff measuring device, which is simple in its construction and arrangement, providing for the expeditious and accurate marking of the trousers leg for the desired size of cuff, strong, durable, thoroughly efficient and convenient in its use, and inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a plan of a trousers leg, showing the adaptation therewith of a measuring device in accordance with this invention, to provide for the accurate marking of the trousers leg for the size of cuff desired.

Figure 2 is a top plan view of a measuring device in accordance with this invention, set up to provide for the marking of trousers legs for cuffs of different sizes.

Figure 3 is a section on line 3—3, Figure 2.

Figure 4 is a perspective view of a modified form of measuring device in accordance with this invention, to provide for the marking of a trousers leg for one size of cuff.

Figure 5 is an end view of the form shown in Figure 4.

Figure 6 is a section on line 6—6, Figure 4.

Referring to Figures 1 to 3 of the drawings, the device includes a body portion in the form of a frame consisting of a pair of side bars 1, 2, and a pair of end bars 3, 4. The side bars 1, 2, are of greater length than the end bars 3, 4, and the side bar 1 is of greater width than the side bar 2. The side bars 3, 4, are of materially greater width than the side bars 1, 2.

The side bar 2 has its upper face provided with conventional means, as at 5, to constitute an inch scale and which extends from the end bar 3 to the end bar 4, and said scale 5 is employed for measuring the width of a trousers leg 6.

The upper face of the end bar 3, as well as the upper face of the end bar 4, is provided with conventional means to set up a pair of oppositely extending measuring scales. The oppositely extending measuring scales on the end bar 3 are the same as that on the end bar 4, and the oppositely extending scales are indicated at 7, 8. The scale 7 on the end bar 3 is opposite the scale 7 on the end bar 4, and the scale 8 on the end bar 3 is opposite the scale 8 on the end bar 4.

The oppositely extending scales 7, 8, are provided for measuring on the trousers leg to provide for a cuff from one-quarter inch to two inches, although it is to be understood that each scale 7 or 8 can be greater than a two inch scale if desired. The scale 7 includes a one-quarter inch indication, as at 9, a half inch indication as at 10, a three-quarters inch indication, as at 11, a one inch indication, as at 12, an inch and a quarter indication, as at 13, an inch and one-half indication, as at 14, an inch and three-quarters indication, as at 15, and a two inch indication, as at 16. Extending from each of said indications is a graduation mark 17.

The scale 8 includes a quarter inch indication 18, a half inch indication 19, a three-quarters inch indication 20, a one inch indication 21, a one and one-quarter inch indication 22, a one and one-half inch indication 23, a one and three-quarters inch indication 24, and a two inch indication 25. Leading from each of said indications of the scale 8 is a graduation mark 26. The corresponding indications of the four scales are colored alike but the indications of each scale are differently colored. In this connection it will be stated, by way of example, that the quarter inch indications of the several scales are red, the one-half inch indications of the several scales blue, and the other like indications of the scales are differently colored, but as before stated, the indications of a scale are differently colored. This makes the like indications of the scales very distinct and quickly noticeable.

Projecting from the inner edge of the end bar 3 and terminating at the inner edge of the end bar 4, are a series of guide bars 27, 28, 29, 30, 31, 32, 33 and 34 for a marking implement and which provide for accurate marking when the implement is employed on the trousers leg, as indicated at 34' on the trousers leg 35, Figure 1. The guide bars are triangular in cross section and one edge of the bar 27 alines with the graduation mark 17 of the indication 16, and the other edge of the bar 27 alines with the graduation mark 17 of the indication 15. One edge of the bar 28 alines with the graduation mark 17 of the indication 14 and its other edge with the graduation mark 17 of the indication 13. The bar 29 has one edge thereof alining with the graduation mark 17 of the indication 12 and its other edge alining with the graduation mark 17 of the indication 11. The bar 30 has one edge thereof alining with the graduation mark 17 of the indication 10, and its other edge alining with the graduation mark 17 of the indication 9. The bar 32 has one edge thereof alining with the graduation mark 26 of the indication 19, and its other edge alining with the graduation mark 26 of the indication 20. The bar 33 has one edge thereof alining with the graduation mark 26 of the indication 21 and its other edge alining with the graduation mark 26 of the indication 22. The bar 34 has one edge alining with the graduation mark 26 of the indication 23 and its other edge with the graduation mark 26 of the indication 24. The side bar 1 has a bevelled inner side, as at 35', and the inner edge of said side bar 1 alines with the graduation mark 26 of the indication 2.

At the beginning of the scale 7, or the scale 8, the end bar 3 as well as the end bar 4, is provided with conventional means to constitute an indicating pointer 36, which alines with one edge of the bar 31. The other edge of the bar 31 alines with the graduation mark 26 of the indication 18.

The inner side edge of the end bar 3, as well as the end bar 4, is bevelled as at 37, and secured to the side bar 1 and projecting therefrom, as well as offset with respect thereto, is a handle 38.

The measuring device as illustrated in Figures 1 to 3 is employed for accurately measuring a trousers leg for the size of cuff desired, as well as providing for the accurate marking of the trousers leg in a manner as shown in Figure 1. The device sets up a means whereby the trousers leg can be measured and marked for a cuff of a width of a quarter inch or one-half inch, three-quarters inch, one inch, one and one-quarter inch, one and one-half inch, one and three-quarters inch and two inches.

When using the device, the length of the trousers leg is measured and marked and after being marked, the device is placed upon the marking so that the scales 7 will project in one direction therefrom and the scales 8 in the other direction, and the operator then after determining the size of cuff desired utilizes certain of the bars 27 to 34 as a measuring guide for a marking implement so that the trousers leg can be marked in the manner as indicated at 34' in Figure 1. If a cuff is to be a width of one quarter inch, the marking is had against the edges of the bars 30 and 31 which aline with the indications 9 and 18. If the cuff is to equal two inches, the operator marks the trousers leg along the edges of the bar 27 and end bar 1 which aline with the indications 16 and 25. If the cuff is to be one inch in width, then the marking of the trousers leg is had along the edges of the bars 29 and 33 which aline with the indications 12 and 21. After one side of the trousers leg has been marked in a manner as indicated at 34', Figure 1, the device is removed and the trousers leg is lifted and marked at its edges after which the trousers leg is reversed, the device placed thereon, and the marking had against the edges of those bars which aline with the markings on the edges of the trousers leg. This arrangement provides for accurate markings on both sides of the trousers leg so that when the cuff is completed, it will be of uniform width throughout.

In the form shown in Figures 4 to 6 of the drawings, a measuring device is set up to provide for the marking of a trousers leg for a cuff of a predetermined size, that is to say, the device shown in Figures 4 and 5 is set up for the marking of a trousers leg of but one size of cuff, and referring to Figures 4 to 6 of the drawings, the measuring device consists of a rectangular frame formed of a pair of end bars 39 and 40, a pair of side bars 41, 42 and an intermediate bar 43 which is equally spaced relative to the bars 41 and 42. Secured to and projecting from the bar 41, as well as being offset relative thereto, is a handle 44.

When using the form of device as shown in Figures 4 to 6, the length of the trousers leg is first measured after which the device is placed upon the marked trousers leg with the bar 43 at the marking. The operator then utilizes the bars 41, 42 and 43 as a guide for a marking implement and begins to mark at the bar 42, then at the bar 43 and finally at the bar 41. The trousers leg is then lifted and marked at its edges in alinement with the other markings, after which the trousers leg is reversed and the device placed thereon with the bar alining with the marked edges. The trousers leg is then marked in a manner as referred to whereby both sides of the trousers leg will be properly marked for the size of cuff which is to be formed.

Although the preferred embodiment of the invention is as illustrated and described, yet it is to be understood that changes in the details of construction can be had which will fall within the light of the invention as claimed.

What I claim is:—

1. A device for the purpose set forth comprising a frame including a pair of side bars and a pair of end bars, each of said end bars being provided with a pair of scales extending oppositely from a medial reference line, and a plurality of combined guide and measuring bars extending from one of the end bars to the other and having the edges thereof alining with certain of the graduation marks of the scales to provide for the measuring of trousers cuffs of various widths.

2. A device for the purpose set forth comprising a frame including a pair of side bars and a pair of end bars, each of said end bars being provided with a pair of scales extending oppositely from a medial reference line, and a plurality of combined guide and measuring bars extending from one of the end bars to the other and having the edges thereof alining with certain of the graduation marks of the scales to provide for the measuring of trousers cuffs of various widths, the indications of each of said scales at each end being differently colored and having like colors for corresponding scale indications.

3. A device for the purpose set forth comprising a frame including a pair of side bars and a pair of end bars, each of said end bars being provided with a pair of scales extending oppositely from a medial reference line, and a plurality of combined guide and measuring bars extending from one of the end bars to the other and having the edges thereof alining with certain of the graduation marks of the scales to provide for the measuring of trousers cuffs of various widths, each of said combined measuring and guide bars being triangular in contour.

4. A device for the purpose set forth comprising a frame including a pair of side bars and a pair of end bars, each of said end bars being provided with a pair of scales extending oppositely from a medial reference line, and a plurality of combined guide and measuring bars extending from one of the end bars to the other and having the edges thereof alining with certain of the graduation marks of the scales to provide for the measuring of trousers cuffs of various widths, said frame being rectangular in contour and of a length greater than the width of the trousers leg and further having one of its side bars provided with scales for measuring the width of a trousers leg.

5. A device for the purpose set forth comprising a frame provided at each end with a pair of oppositely extending scales, a plurality of spaced measuring and guide bars arranged within the frame and associated with one pair of said scales, and a plurality of spaced measuring and guide bars arranged within said frame and associated with the other pair of said scales.

6. A device for the purpose set forth comprising a frame provided at each end with a pair of oppositely extending scales, a plurality of spaced measuring and guide bars arranged within the frame and associated with one pair of said scales, and a plurality of spaced measuring and guide bars arranged within said frame and associated with the other pair of said scales the indications of the scales at one end being correspondingly colored with like indications of the scales at the other end.

In testimony whereof, I affix my signature hereto.

LOUIS DRESCHLER.